United States Patent
Jang et al.

(10) Patent No.: US 8,111,254 B2
(45) Date of Patent: Feb. 7, 2012

(54) DEPTH IMAGE-BASED REPRESENTATION METHOD FOR 3D OBJECT, MODELING METHOD AND APPARATUS, AND RENDERING METHOD AND APPARATUS USING THE SAME

(75) Inventors: Gyeongja Jang, Yongin-si (KR); Mahnjin Han, Yongin-si (KR); Keunho Kim, Seoul (KR); Shinlun Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 552 days.

(21) Appl. No.: 11/401,223

(22) Filed: Apr. 11, 2006

(65) Prior Publication Data

US 2006/0227132 A1  Oct. 12, 2006

Related U.S. Application Data

(60) Provisional application No. 60/669,926, filed on Apr. 11, 2005.

(30) Foreign Application Priority Data

Oct. 25, 2005 (KR) .................. 10-2005-0100895

(51) Int. Cl.
*G06T 15/00* (2011.01)
(52) U.S. Cl. ...................................... 345/419
(58) Field of Classification Search .................. None
See application file for complete search history.

(56) References Cited

U.S. PATENT DOCUMENTS 5,923,330 A * 7/1999 Tarlton et al. ............... 345/419
6,331,853 B1 * 12/2001 Miyashita ................... 345/427
2003/0214502 A1 11/2003 Park et al.
2003/0218606 A1 * 11/2003 Zhirkov et al. ............ 345/419

FOREIGN PATENT DOCUMENTS

| CN | 1430183 A | 7/2003 |
|---|---|---|
| EP | 1 321 893 | 1/2005 |
| JP | 2003-296755 | 10/2003 |
| JP | 2004-334850 | 11/2004 |
| KR | 2003-43637 | 6/2003 |

OTHER PUBLICATIONS

Preda, M., Information Technology—Coding of audio-visual objects—Part 16: Animation Framework eXtesnion, Amendment 1: AFX extension, Jul. 2004, International Organization for Standardisation, pp. 1-40.*
Office Action issued by Korean Intellectual Property Office in International Application No. PCT/KR2006/001325 on Jul. 18, 2006.
Chinese Office Action for corresponding to Chinese Patent Application No. 2006800115812 dated Jan. 29, 2010, 11 pgs.
Japanese Office Action for corresponding Japanese Patent Application No. 2008-506372 dated Feb. 22, 2009, 3 pgs.

* cited by examiner

*Primary Examiner* — Said Broome

(74) *Attorney, Agent, or Firm* — Staas & Halsey LLP

(57) ABSTRACT

A depth image-based representation (DIBR) method of modeling a 3-dimensional (3D) object, by which the 3D object is expressed by depth information, color information, and camera parameters or geometry information, color information, and camera parameters. The camera parameters include position, orientation, ranges of camera view or angle (fieldOfView), front and back of a camera volume (nearPlane and farPlane) and projection information(orthographic) on whether an object is projected on a camera orthographically or perspectively, and, when at least one of modeling and rendering of a 3D object is performed, values of the camera parameters are changed in real time.

18 Claims, 8 Drawing Sheets

DEPTH IMAGE-BASED REPRESENTATION METHOD FOR 3D OBJECT, MODELING METHOD AND APPARATUS, AND RENDERING METHOD AND APPARATUS USING THE SAME

CROSS-REFERENCE TO RELATED APPLICATIONS

This application claims the benefit of U.S. Provisional Application No. 60/669,926, filed Apr. 11, 2005 in the US Patent and Trademark Office and Korean Patent Application No. 2005-100895, filed Oct. 25, 2005, in the Korean Intellectual Property Office, the disclosures of which are incorporated herein by reference.

BACKGROUND OF THE INVENTION

1. Field of the Invention

The present invention relates to depth image-based representation (DIBR) of a 3-dimensional (3D) object, and, more particularly, to a DIBR method of modeling a 3D object enabling camera parameters of animation data to be changed in real time in order to improve an animation function of a 3D object, and a modeling method and apparatus and a rendering method and apparatus for a 3D object using the same.

2. Description of the Related Art

FIG. 1 is a series of diagrams illustrating a process of modeling a depth image-based representation (DIBR) object and rendering a DIBR object using a DIBR format generated in a modeler. With reference to FIG. 1, the DIBR modeling process will now be explained. First, using an authoring tool, a 3D object is generated as 3D data or animated 3D data. Using a DIBR modeler, the 3D data is expressed by fixed camera parameters, and depth and color information of the camera parameters, so that the 3D data is generated in an MPEG DIBR format.

Also, according to the DIBR rendering process, by using a DIBR renderer, and by using the camera parameters and depth and color information generated in the modeler, a view volume and a DIBR object are generated as illustrated in FIG. 1. Then, a camera view frustum is generated and a DIBR object in the view frustum is projected on a screen.

When 3D data is generated or rendered using the DIBR method, required camera parameters, depth information and color information are expressed in DepthImage node and DepthImageV2 node of an MPEG specification. The MPEG DepthImage node and DepthImageV2 node are as follows. Here, the camera parameters are included in the fields of the DepthImage node and DepthImageV2 node.

```
DepthImage { #%NDT=SF3Dnode
field SFVec3f        position        0 0 10
field SFRotation     orientation     0 0 1 0
field SFVec2f        fieldOfView     0.785398 0.785398
field SFFloat        nearPlane       10
field SFFloat        farPlane        100
field SFBool         orthographic    TRUE
field SFDepthTextureNode  diTexture  NULL
}
DepthImageV2 { #%NDT=SF3DNode
field SFVec3f        position        0 0 10
field SFRotation     orientation     0 0 1 0
field SFVec2f        fieldOfView     0.785398 0.785398
field SFFloat        nearPlane       10
field SFFloat        farPlane        100
field    SFVec2f         splatMinMax     0.1115 0.9875
```

-continued

```
field SFBool         orthographic    TRUE
field SFDepthTextureNode  diTexture  NULL
}
```

The fields representing the camera parameter information includes fields for position, orientation, ranges of camera view or angle (fieldOfView), front and back of a camera volume (nearPlane and farPlane) and projection information (orthographic) on whether an object is projected on a camera orthographically or perspectively, and a diTexture field having depth and color information. Also, in addition to these fields, the DepthImageV2 node further includes a field (splatMinMax) indicating a shape to be drawn on a screen, i.e., the minimum value and the maximum value of a splat vector length.

The fields indicating the camera parameter information, included in both the DepthImage node and DepthImageV2 node, are position, orientation, ranges of camera view or angle (fieldOfView), front and back of a camera volume (nearPlane and farPlane) and projection information(orthographic) on whether an object is projected on a camera orthographically or perspectively, (camera parameters: position, orientation, fieldOfView, nearPlane, farPlane, orthographic), and are defined as field types.

Here, when a camera parameter field is defined as the field type, once the camera parameter value is set, the parameter value cannot be changed. Accordingly, when still or animated and/or deformed DIBR data is generated by using the DepthImage node and DepthImageV2 node, camera parameters can be set only once. Also, when the DIBR data is rendered, the camera parameters set in the modeler should be used without change to generate a view volume and in the view volume, a DIBR object should be expressed.

FIG. 2 is a schematic diagram illustrating a process of generating and rendering still or animated DIBR data using fixed camera parameters having the field type (position, orientation, the ranges of camera view or angle (fieldOfView), the front and back of a camera volume (nearPlane and farPlane) and projection information (orthographic) on whether an object is projected on a camera orthographically or perspectively).

Since it is true that once camera parameter values are set in a modeling stage, the values cannot be changed, a possibility of camera animation is not considered. Accordingly, even in a rendering stage, only the fixed camera parameter values set in the modeling stage should be used.

Also in the modeling stage, since only the fixed camera parameters having the field type are used, changing the camera parameters such that they become suitable for dynamically deforming an object in order to model the dynamically deforming object may be impossible. Accordingly, as illustrated in FIG. 3, when the animation of an animated and deformed object is generated, an entire frame of an animation desired to be generated is observed. Then, a maximum bounding box of the object should be calculated. This is a process required to set the bounding box of the object appropriately in order to maintain suitable resolutions of all objects when modeling is performed. Accordingly, camera parameters corresponding to a view frustum are set. Then, when an animation frame which goes beyond the bounding box is added in the modeling stage, the maximum bounding box needs to be updated. The bounding box should be updated, and animation should be generated again from the first frame (2Pass). Accordingly, in the conventional of modeling and/or rendering an image with the fixed camera parameters, the additional manipulation reduces the speed of authoring and causes inconvenience. Also, memory space is unnecessarily used. Accordingly, real time animation reflecting the camera parameters cannot be generated.

Furthermore, when modeling and rendering are performed, there is a possibility that the picture quality of a restored image is degraded. More specifically, the still camera that cannot change the camera parameter values cannot track a moving object that changes with respect to time. Also, the still camera may lose data in hidden areas and deformed areas of the moving object.

SUMMARY OF THE INVENTION

Aspects of the present invention provide a depth image-based representation (DIBR) method of modeling a 3-dimensional (3D) object, having camera parameters suitable for modeling a moving object deformed in a DIBR modeler.

Aspects of the present invention also provide a method and apparatus for 3D object modeling suitable for DIBR animation using the DIBR method of modeling a 3D object.

Aspects of the present invention also provide a method and apparatus for rendering DIBR animation reflecting changes in camera parameters in real time, in which the data modeled using the DIBR method of modeling a 3D object is rendered.

According to an aspect of the present invention, there is provided a depth image-based representation (DIBR) method of modeling a 3-dimensional (3D) object, by which the 3D object is expressed by depth information, color information, and camera parameters, or geometry information, color information, and camera parameters, wherein the camera parameters include position, orientation, ranges of camera view or angle (fieldOfView), front and back of a camera volume (nearPlane and farPlane) and projection information(orthographic) on whether an object is projected on a camera orthographically or perspectively, and when at least one of modeling and rendering of a 3D object is performed, values of the camera parameters can be changed in real time. The field type of a data structure expressing camera parameters that are changed in real time may be set to exposedField, indicating that the field can be changed in real time.

According to another aspect of the present invention, there is provided a DIBR apparatus for modeling a 3D object, including: a 3D data processing unit adding camera parameters to at least one of still data and animation data of an input 3D object, and if the animation data changes in real time, changing the camera parameters corresponding to the animation data in real time, and extracting a Point or Point cloud primitive expressing the 3D object from the still data or animation data; a DIBR data generation unit converting data generated in the 3D data processing unit into a DIBR data format; and a camera animation data generation unit extracting time information of animation data, and camera parameter values corresponding to the animation data and changing in real time, from data generated in the 3D data processing unit.

According to another aspect of the present invention, there is provided a DIBR method of modeling a 3D object including: adding camera parameters to at least one of still data and animation data of an input 3D object, and if the animation data changes in real time, changing the camera parameters corresponding to the animation data in real time; extracting a Point or Point cloud primitive expressing the 3D object from the still data or animation data; converting processed data into a DIBR data format; and extracting time information of animation data, and camera parameter values corresponding to the animation data and changing in real time, from the processed data.

According to another aspect of the present invention, there is provided a DIBR apparatus for rendering a 3D object, including: a DIBR input unit receiving the DIBR data of the 3D object; a camera animation data input unit receiving time information of animation data of the 3D object and camera parameter values corresponding to the animation data and changing in real time; and an animation reproduction unit reproducing the animation of the 3D object, by using the DIBR data, the time information of the animation data and camera parameter values corresponding to the animation data.

According to another aspect of the present invention, there is provided a DIBR method of rendering a 3D object, including: receiving DIBR data of the 3D object; receiving time information of animation data of the 3D object and camera parameter values corresponding to the animation data and changing in real time; and reproducing animation of the 3D object, by using the DIBR data, the time information of the animation data and the camera parameter values corresponding to the animation data.

According to another aspect of the present invention, there is provided a DIBR method of rendering a 3D object, including: receiving camera motion information, variable view frustum information, and reference images generated by modeling a 3D object; and generating a DIBR object by using the camera motion information, variable view frustum information, and reference images, and using the variable view frustum information and the camera motion information in rendering.

According to still another aspect of the present invention, there is provided a computer readable recording medium having embodied thereon a computer program for executing the methods.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
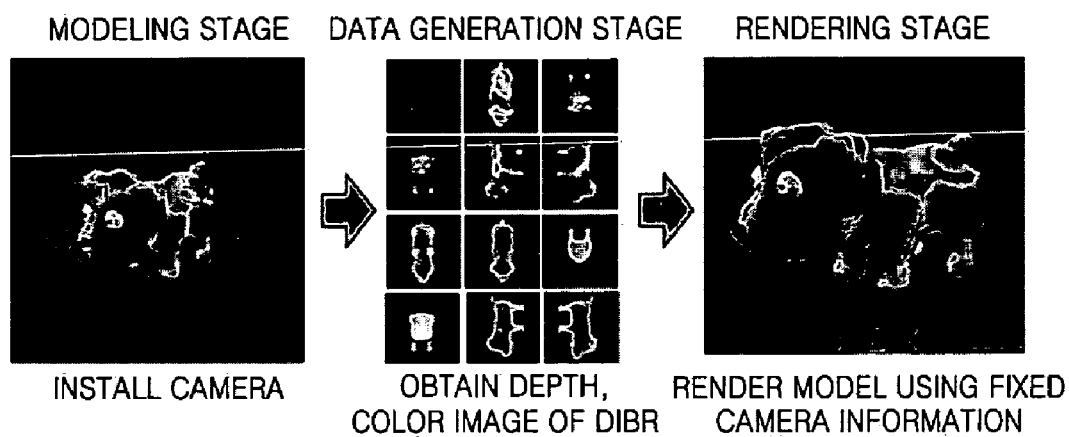
FIG. 1 is a series of diagrams illustrating a process of modeling a depth image-based representation (DIBR) object and rendering a DIBR object using a DIBR format generated in a modeler.
Figure 2:
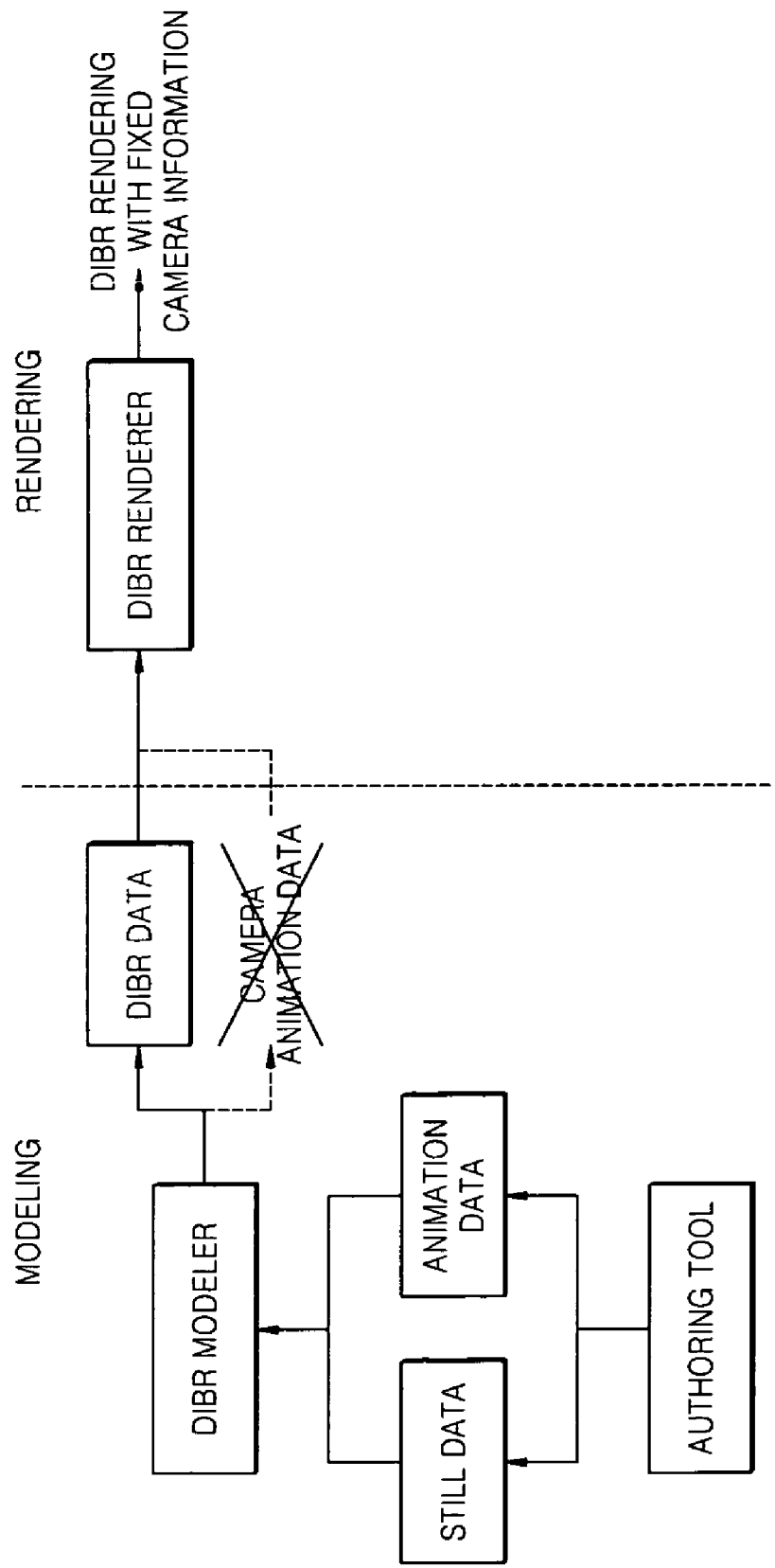
FIG. 2 is a schematic flowchart illustrating a process of modeling and rendering an image with fixed camera parameters according to a conventional method.
Figure 3:
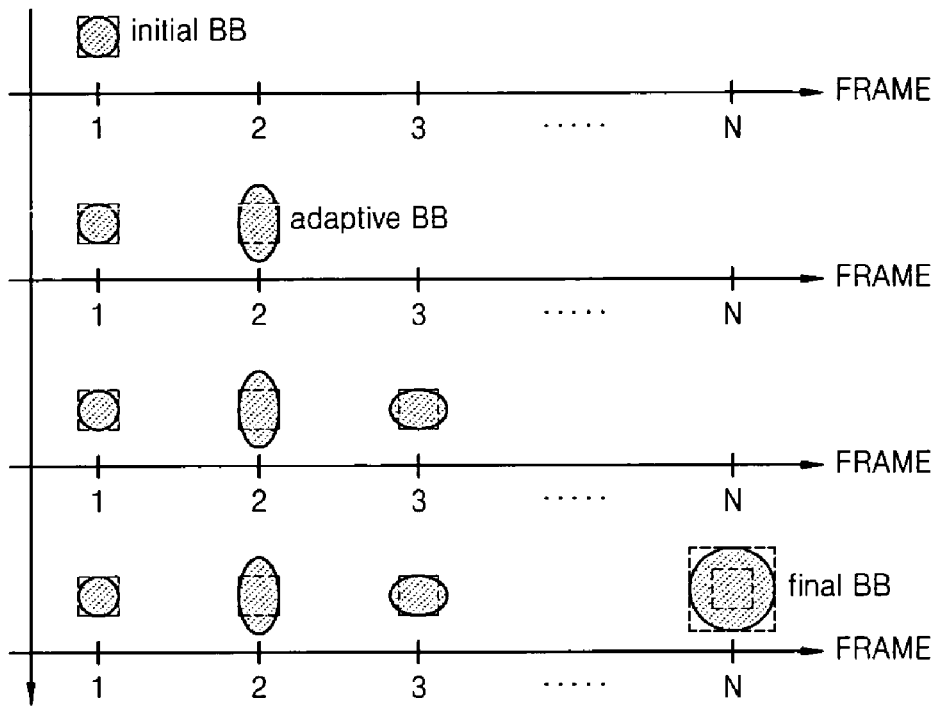
FIG. 3 illustrates a conventional procedure of obtaining a bounding box of an object when fixed camera parameters are used to implement a DIBR animation.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A depth image-based representation (DIBR) method of modeling a 3-dimensional (3D) object, and a modeling method and apparatus and a rendering method and apparatus for a 3D object using the same will now be described more fully with reference to the accompanying drawings, in which exemplary embodiments of the invention are shown.

First, the DIBR method of modeling a 3D object according to an embodiment of the present invention will now be explained.

In order to generate DIBR animation reflecting camera parameters in real time, types of camera parameter fields (position, orientation, fieldOfView, nearPlane, farPlane, orthographic) indicating position, orientation, ranges of camera view or angle (fieldOfView), front and back of a camera volume (nearPlane and farPlane) and projection information (orthographic) on whether an object is projected on a camera orthographically or perspectively should be changed in a MPEG DepthImage node and a DepthImageV2 node.

As shown below, the type of these fields is changed from a 'field' type, which indicates a fixed camera parameter, to an 'exposedField' type, which reflects camera parameters changing in real time:

```
DepthImage { #%NDT=SF3DNode
exposedField    SFVec3f            position       0 0 10
exposedField    SFRotation         orientation    0 0 1 0
exposedField    SFVec2f            fieldOfView    π/4 π/4
exposedField    SFFloat            nearPlane      10
exposedField    SFFloat            farPlane       100
exposedField    SFBool             orthographic   TRUE
field           SFDepthTextureNode diTexture      NULL
}
DepthImageV2 { #%NDT=SF3DNode
exposedField    SFVec3f            position       0 0 10
exposedField    SFRotation         orientation    0 0 1 0
exposedField    SFVec2f            fieldOfView    π/4 π/4
exposedField    SFFloat            nearPlane      10
exposedField    SFFloat            farPlane       100
field           SFVec2f            splatMinMax    0.1115 0.9875
exposedField    SFBool             orthographic   TRUE
field           SFDepthTextureNode diTexture      NULL
}
```

Figure 4:
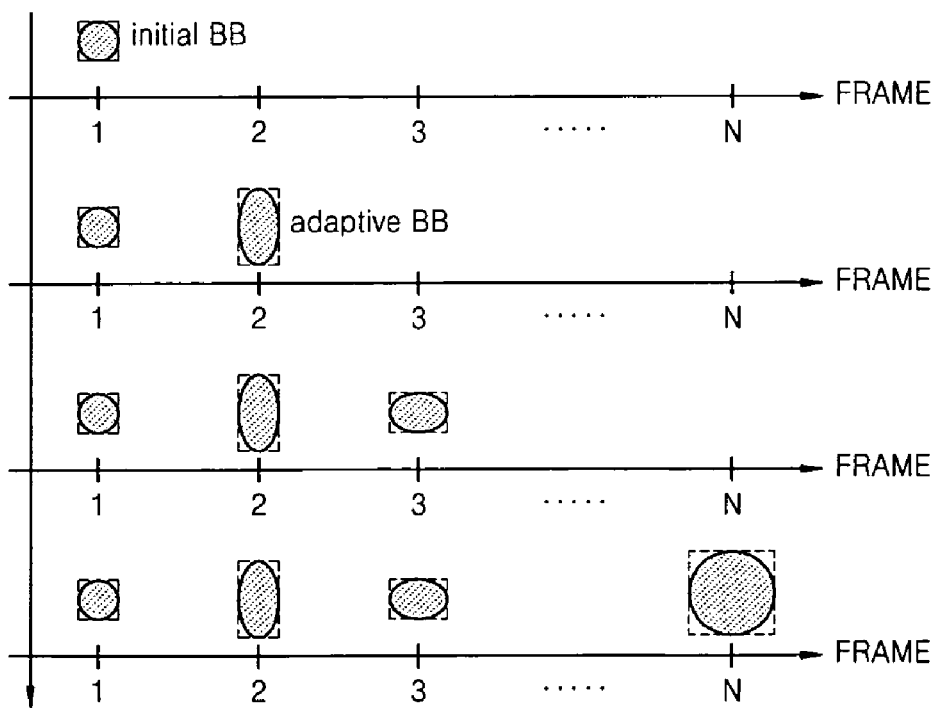
FIG. 4 illustrates a procedure of obtaining a bounding box of an object when a DIBR animation is implemented according to an embodiment of the present invention.

If the camera parameters whose type is changed to the 'exposedField' type are used for camera animation, a camera view volume (camera view frustum) may be suitably set for a bounding box of an object. Also, when modelling is performed, a bounding box suitable for the object of each frame of an animation being generated is extracted, as illustrated in FIG. 4. Therefore, extraction of camera animation information that includes a maximum bounding box (BB) of all frames of the animation being generated is not needed. Accordingly, without lowering of the speed of modelling, authoring may be easily performed (1Pass). Also, since a bounding box with a size suitable for each frame is extracted, the picture quality of rendering is improved. In the modelling stage, a function that changes camera parameters is provided so that the position, orientation, and view frustum of the camera may be adjusted. Also, the position of the camera may be changed along the animation path of an object. In the rendering stage, the picture quality may be adjusted using dynamic camera parameters.

In the MPEG standard, the type of fields related to the camera parameters of the DepthImage node and DepthImageV2 node has been changed to 'exposedField'. Accordingly, in a modeling process, camera parameters may be changed. Also, a modified draft of extrinsic camera parameters in DIBR has been adopted.

Figure 5:
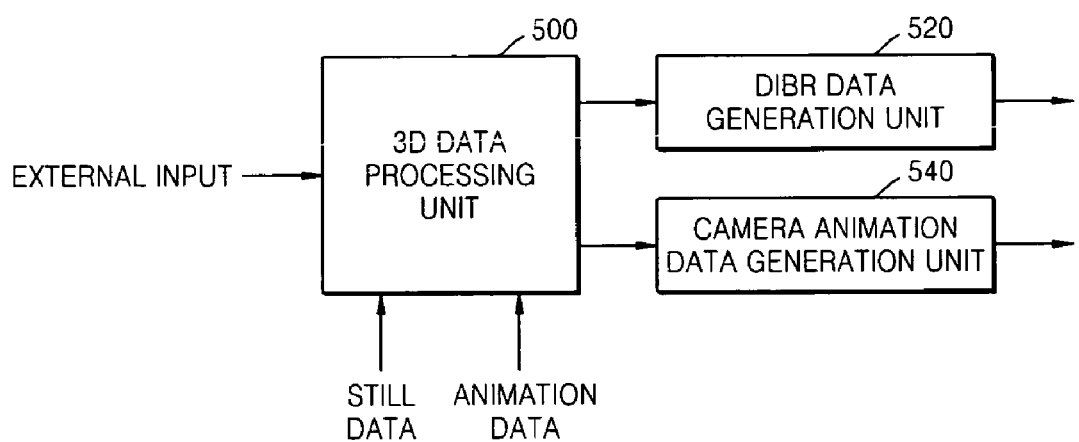
FIG. 5 is a block diagram of a structure of a DIBR modeling apparatus for modeling a 3D object, to which a camera animation support function according to an embodiment of the present invention is added.

FIG. 5 is a block diagram of a structure of a DIBR modeling apparatus for a 3D object, to which a camera animation support function is added. As shown in FIG. 5, the DIBR modeling apparatus includes a 3D data processing unit 500, a DIBR data generation unit 520, and a camera animation data generation unit 540.

The 3D data processing unit 500 adds camera information to at least one of still data and animation data of an input 3D object. If the animation data changes in real time, the 3d data processing unit 500 changes camera parameters corresponding to the animation data in real time. Also, the 3D data processing unit 500 extracts Point or Point cloud primitive to express the 3D object from the still data or the animation data.

Figure 10:
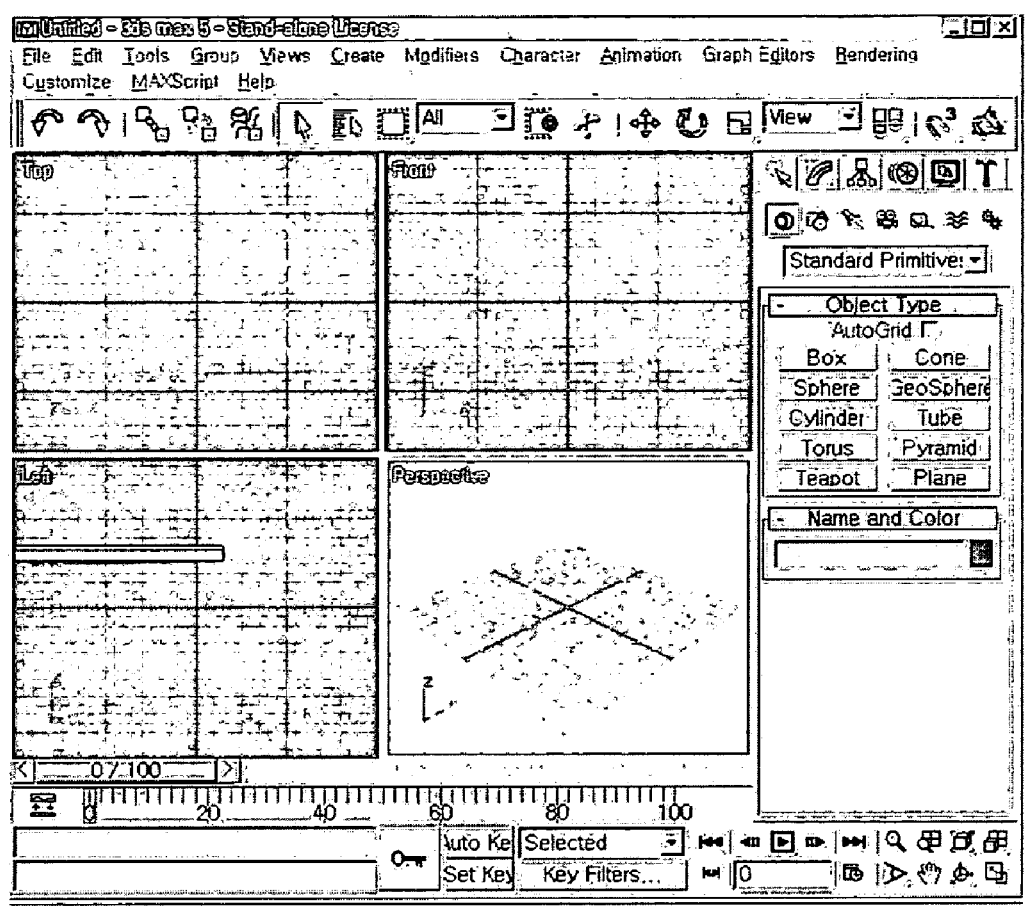
FIG. 10 illustrates a 3DS MAX authoring tool screen as an authoring tool for 3D graphics data.

The still data or animation data is usually generated by an authoring tool shown in FIG. 10. The camera information includes the number of cameras, and camera parameter information.

The DIBR data generation unit 520 converts the data generated in the 3D data processing unit 500 into a DIBR data format. For example, nodes provided in the MPEG (DepthImage, SimpleTexture, PointTexture, OctreeImage, DepthImageV2, SimpleTextureV2, and PointTextureV2) are generated as DIBR data. The DIBR data format includes a reference image.

The camera animation data generation unit 540 extracts time information of animation data and camera parameter values, which correspond to the animation data, and which change in real time from the data that is generated in the 3D data processing unit 500.

The camera parameters are substantially similar to those used in the DIBR method of modeling a 3D object. That is, the camera parameters include position, orientation, ranges of camera view or angle (fieldOfView), front and back of a camera volume (nearPlane and farPlane) and projection information (orthographic) on whether an object is projected on a camera orthographically or perspectively, and, when at least one of modeling and rendering a 3D object is performed, the values of the camera parameters may be changed in real time.

Figure 6:
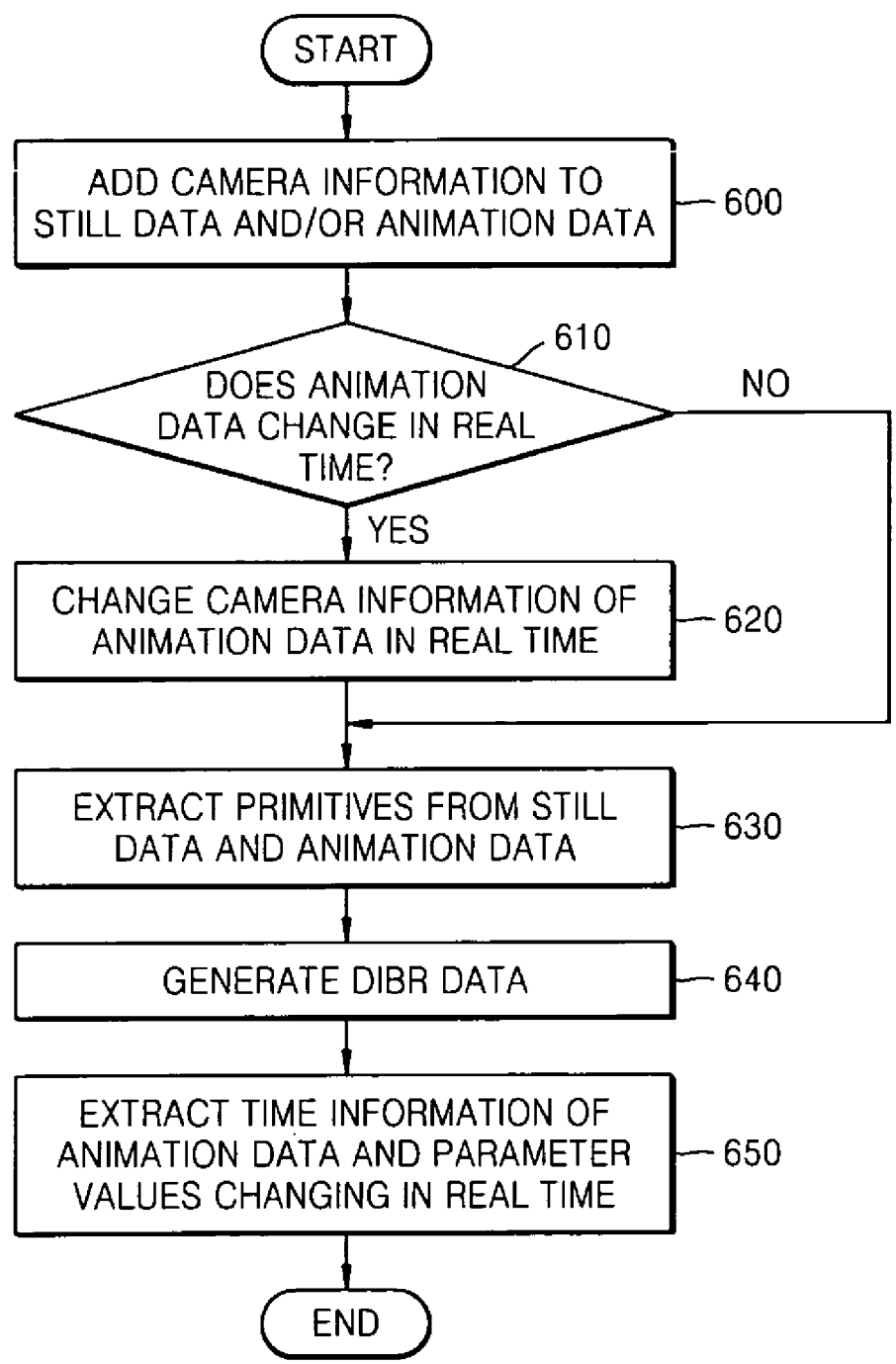
FIG. 6 is a flowchart illustrating a DIBR modeling method of modeling a 3D object according to an embodiment of the present invention.

As noted above, the present invention relates to a depth image-based representation (DIBR) of a 3-dimensional (3D) object, and, more particularly, to a DIBR method of modeling a 3D object enabling camera parameters of animation data to be changed in real time in order to improve an animation function of 3D object, and a modeling method and apparatus and a rendering method and apparatus for a 3D object using the same. FIG. 6 is a flowchart illustrating a DIBR method of modeling a 3D object. With reference to FIGS. 5 and 6, the DIBR method of modeling a 3D object and an operation of the modeling apparatus of FIG. 5 using the DIBR method, will now be explained.

If at least one of still data and animation data of a 3D object is input to the 3D data processing unit 500, the 3D data processing unit 500 adds camera information to the still data or animation data in operation 600. Here, if the animation data changes in real time in operation 610, the camera parameters corresponding to the animation data are also changed in real time in operation 620. Also, the 3D data processing unit 500 extracts Point or Point cloud primitive expressing the 3D object, from the still data or animation data in operation 630.

The data processed by the DIBR data generation unit 520 in operations 600 through 630 is converted into a DIBR data format in operation 640. The DIBR data format includes a reference image.

Also, in operation 650, the camera animation data generation unit 540 extracts time information of the animation data and camera parameter values, which correspond to the animation data and which change in real time, from the data that is processed in operations 600 through 630.

Figure 7:
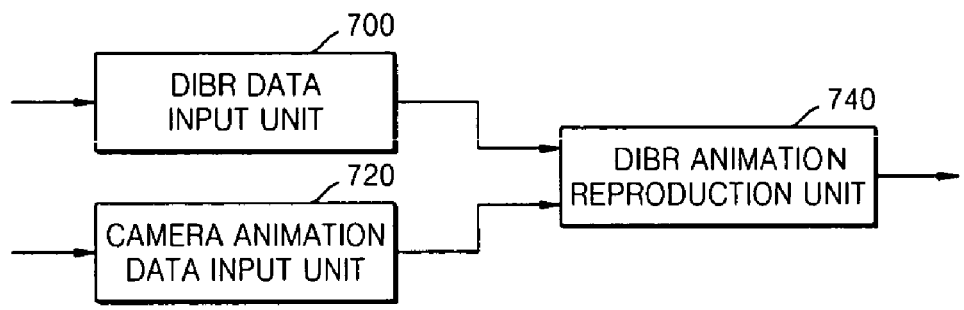
FIG. 7 is a block diagram of a structure of a DIBR rendering apparatus for modeling a 3D object, to which a camera animation support function according to an embodiment of the present invention is added.

FIG. 7 is a block diagram of a structure of a DIBR rendering apparatus to model a 3D object, to which a camera animation support function is added. The DIBR rendering apparatus comprises a DIBR data input unit 700, a camera animation data input unit 720, and an animation reproduction unit 740.

The DIBR data input unit 700 receives DIBR data of a 3D object. The camera animation data input unit 720 receives time information of the animation data and camera parameter values corresponding to the animation data and changing in real time. By using the DIBR data, the time information of the animation data and camera parameter values corresponding to the animation data and changing in real time, the animation reproduction unit 740 reproduces the animation of the 3D object.

Figure 8:
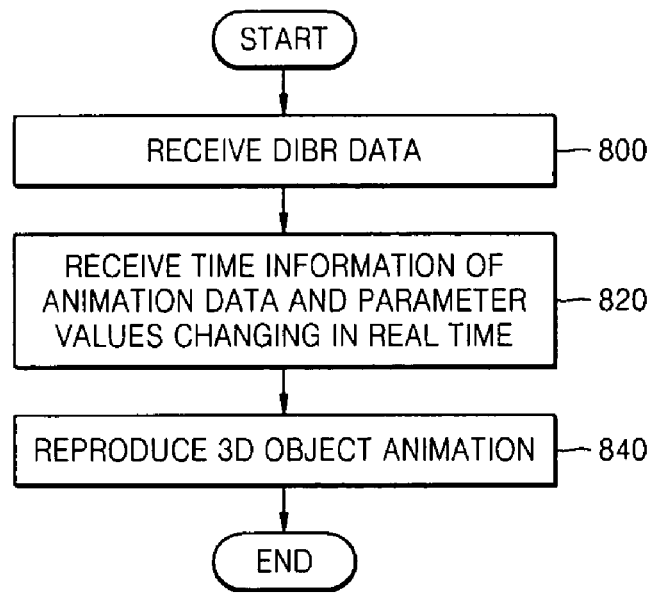
FIG. 8 is a flowchart illustrating a DIBR rendering method of modeling a 3D object according to an embodiment of the present invention.

FIG. 8 is a flowchart of illustrating a DIBR method of rendering a 3D object. Referring to FIGS. 7 and 8, the DIBR method of rendering a 3D object and an operation of the rendering apparatus of FIG. 7 using the DIBR method will now be explained.

DIBR data of the 3D object is received through the DIBR data input unit 700 in operation 800. Also, through the camera animation data input unit 720, time information of animation data of the 3D object and camera parameter values corresponding to the animation data and changing in real time are received in operation 820. If the DIBR data, the time information of the animation data and camera parameter values corresponding to the animation data and changing in real time are received, by using the DIBR data, the time information of the animation data and the camera parameter values corresponding to the animation data and changing in real time, the DIBR animation reproduction unit 740 reproduces the animation of the 3D object in operation 840. As a result, real time DIBR animation reflecting the camera parameters is enabled.

Figure 9:
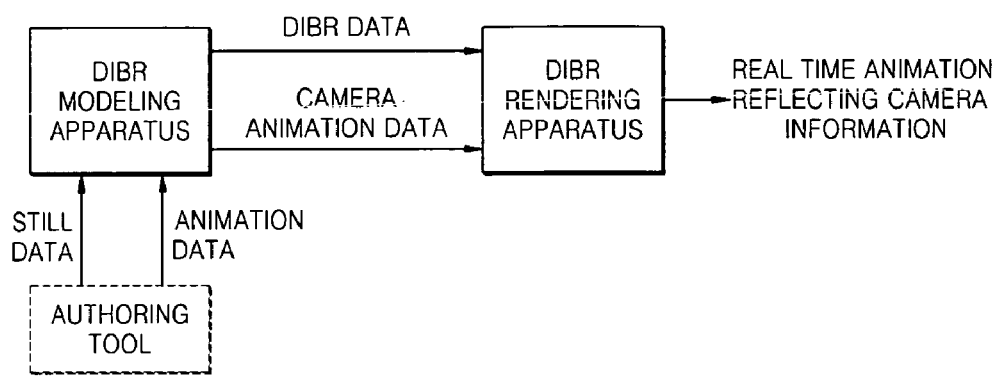
FIG. 9 is a block diagram of an entire structure of a modeling and rendering apparatus for a 3D object, to which a camera animation support function according to an embodiment of the present invention is added.

FIG. 9 is a block diagram of an entire structure of a modeling and rendering apparatus for a 3D object, to which a camera animation support function is added.

The Embodiment Shown in FIG. 10

Meanwhile, the present invention may be used in generating and rendering still or animated DIBR data.

The present invention may also be embodied as computer readable codes on one or more computer readable recording media for use on one or more computers. The computer readable recording medium is any data storage device that stores data which can be thereafter read by a computer system. Examples of the computer readable recording medium include read-only memory (ROM), random-access memory (RAM), CD-ROMs, magnetic tapes, floppy disks, and optical data storage devices, or combinations thereof.

According to the DIBR method of a 3D object and a modelling method and apparatus and a rendering method and apparatus using the same according to aspects of the present invention, in the DepthImage node, camera parameters are set to an 'exposedField' such that the movement of the camera and the view frustum may be changed with respect to the movement or deformation of the 3D object. Also, by using the camera parameters of the DepthImage, a reference image suitable for the characteristic of a DIBR model may be obtained in a modelling stage. Also, by using the camera motions, the variable view frustum, and reference images generated as the result of the modelling, a view frustum and a DIBR object are generated in the rendering stage.

That is, in modelling terms, by providing a modelling method suitable for a moving object, i.e., a view frustum that allows free movement of a camera and control of the camera with respect to motion or deformation of a moving object, authoring may be easily performed. Also, in terms of rendering, with the camera in a DepthImage node specification set to a modified field type, i.e., the exposedField type, animation may be adaptively rendered without degradation of the quality of the picture.

A generation of camera animation using the camera parameters modified to the 'exposedField' type has the following advantages. Since the camera view volume (camera view frustum) may be suitably set for a bounding box of an object, memory space may be saved.

Also, when modeling is performed, as illustrated in FIG. 4, a bounding box suitable for the object of each frame of an animation being generated is extracted, such that extraction of camera animation information, including the maximum bounding box of all frames of the animation being generated is not needed, and the authoring may be easily performed without lowering the speed of the modeling (1Pass). Also, since a bounding box with a size suitable for each frame is extracted, the picture quality of rendering is improved. Also, in the modeling stage, the camera parameter control function enables the adjustment of the position, orientation, and view frustum of a camera.

With respect to an animation path of an object, the position of a camera may also be changed. Furthermore, when modeling is performed, authoring may be performed easily.

In the rendering stage, the picture quality may be adjusted using dynamic camera parameters. Accordingly, by adjusting the resolution adaptively, the picture quality may be improved compared to the conventional method.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A depth image-based representation (DIBR) method of modeling a 3-dimensional (3D) object, by which the 3D object is expressed by depth information, color information, and camera parameters or geometry information, the method comprising:

modeling and/or rendering the 3D object according to the camera parameters;

while the modeling and/or the rendering of the 3D object is performed, changing values of a plurality of different camera parameters, wherein the camera parameters comprise position, orientation, ranges of camera view or angle (fieldOfView), front and back of a camera volume (nearPlane and farPlane) and projection information(orthographic) on whether an object is projected on a camera orthographically or perspectively, by a modeling and/or rendering apparatus, in real time; and generating DIBR data reflecting values of the different camera parameters changing in real time by changing a field type in at least one of an MPEG DepthImage node and a DepthImageV2 node to a field type that reflects the values of the different camera parameters changing in real time;

wherein each of the field types of a data structure expressing the camera parameters that are changed in real time is set to exposedField to indicate that the field is capable of being changed in real time;

wherein the data structure expressing the camera parameters is an MPEG DepthImage node of data type SF3DNode or a DepthImage V2 node of data type SF3DNode.

2. The method of claim 1, wherein for the DepthImage node, the name of a node, the type of a field, the data format of a field, the name of a field, and an initial value of a field in the camera parameters, changeable in real time, are expressed as the following data structure:

| DepthImage { #%NDT=SF3DNode | | | |
|---|---|---|---|
| exposedField | SFVec3f | position | 0 0 10 |
| exposedField | SFRotation | orientation | 0 0 1 0 |
| exposedField | SFVec2f | fieldOfView | π/4 π/4 |
| exposedField | SFFloat | nearPlane | 10 |
| exposedField | SFFloat | farPlane | 100 |
| exposedField | SFBool | orthographic | TRUE |
| field | SFDepthTextureNode | diTexture | NULL |
| }. | | | |

3. The method of claim 1, wherein for the DepthImageV2 node, the name of a node, the type of a field, the data format of a field, the name of a field, and initial value of a field in the camera parameters, changeable in real time, are expressed as the following data structure:

| DepthImageV2 { #%NDT=SF3DNode | | | |
|---|---|---|---|
| exposedField | SFVec3f | position | 0 0 10 |
| exposedField | SFRotation | orientation | 0 0 1 0 |
| exposedField | SFVec2f | fieldOfView | π/4 π/4 |
| exposedField | SFFloat | nearPlane | 10 |
| exposedField | SFFloat | farPlane | 100 |
| field | SFVec2f | splatMinMax | 0.1115 0.9875 |
| exposedField | SFBool | orthographic | TRUE |
| field | SFDepthTextureNode | diTexture | NULL |
| }. | | | |

4. A depth image-based representation (DIBR) apparatus to model a 3-dimensional (3D) object, the apparatus comprising:

a 3D data processing unit to add camera parameters to at least one of still data and/or animation data of an input 3D object, and, when the animation data changes in real time, to change a plurality of different camera parameters in accordance with the animation data in real time, and to extract a Point and/or a Point cloud primitive to express the 3D object from the still data and/or the animation data, wherein the camera parameters comprise position, orientation, ranges of camera view or angle (fieldOfView), front and back of a camera volume (nearPlane and farPlane) and projection information(orthographic) on whether an object is projected on a camera orthographically or perspectively and wherein the 3D data processing unit generates DIBR data reflecting values of the different camera parameters changing in real time by changing a field type in at least one of an MPEG DepthImage node and a DepthImageV2 node to a field type that reflects the values of the different camera parameters changing in real time;

a DIBR data generation unit to convert data generated in the 3D data processing unit into a DIBR data format; and a camera animation data generation unit to extract time information of animation data, and camera parameter values that correspond to the animation data and which change in real time, from data generated in the 3D data processing unit;

wherein each of the field types of a data structure expressing the camera parameters that are changed in real time is set to exposedField to indicate that the field is capable of being changed in real time;

wherein the data structure expressing the camera parameters is an MPEG DepthImage node of data type SF3DNode or a DepthImage V2 node of data type SF3DNode.

5. The apparatus of claim 4, wherein the DIBR data format of the DIBR data generation unit comprises a reference image.

6. A depth image-based representation (DIBR) method of modeling a 3D object, the method comprising:

adding camera parameters to still data and/or animation data of an input 3D object, and, while the animation data changes in real time, changing a plurality of different camera parameters in correspondence with the animation data in real time, wherein the camera parameters comprise position, orientation, ranges of camera view or angle (fieldOfView), front and back of a camera volume (nearPlane and farPlane) and projection information(orthographic) on whether an object is projected on a camera orthographically or perspectively;

generating DIBR data reflecting values of the different camera parameters changing in real time by changing a field type in at least one of an MPEG DepthImage node and a Depth Image V2 node to a field type that reflects the values of the different camera parameters changing in real time;

extracting a Point and/or Point cloud primitive expressing the 3D object from the still data and/or the animation data;

converting processed data into a DIBR data format; and extracting time information of animation data, and camera parameter values corresponding to the real time changing animation data, from the processed data;

wherein each of the field types of a data structure expressing the camera parameters that are changed in real time is set to exposedField to indicate that the field is capable of being changed in real time;

wherein the data structure expressing the camera parameters is an MPEG DepthImage node of data type SF3DNode or a DepthImage V2 node of data type SF3DNode.

7. The method of claim 6, wherein, in the converting of the processed data into the DIBR data format, the DIBR data format of the DIBR data generation unit comprises a reference image.

8. A depth image-based representation (DIBR) apparatus to render a 3D object, the apparatus comprising:
a DIBR input unit to receive DIBR data of the 3D object; a camera animation data input unit to receive time information of animation data of the 3D object and a plurality of different camera parameters corresponding to the animation data and which camera parameters are changeable in real time, the camera parameters including position, orientation, ranges of camera view or angle (fieldOfView), front and back of a camera volume (nearPlane and farPlane) and projection information(orthographic) on whether an object is projected on a camera orthographically or perspectively, and, when at least one of modeling and rendering of the 3D object is performed, values of the camera parameters are changed in real time; and
an animation reproduction unit to reproduce the animation of the 3D object, using the DIBR data, the time information of the animation data and camera parameter values corresponding to the animation data,
wherein the DIBR data received by the DIBR input unit reflects values of the different camera parameters changing in real time by changing a field type in at least one of an MPEG DepthImage node and a DepthImage V2 node to a field type that reflects the values of the different camera parameters changing in real time;
wherein each of the field types of a data structure expressing the camera parameters that are changed in real time is set to exposedField to indicate that the field is capable of being changed in real time;
wherein the data structure expressing the camera parameters is an MPEG DepthImage node of data type SF3DNode or a DepthImage V2 node of data type SF3DNode.

9. A depth image-based representation (DIBR) method of rendering a 3D object, the method comprising:
receiving DIBR data of the 3D object;
receiving time information of animation data of the 3D object and a plurality of different camera parameters corresponding to the animation data and values of which camera parameters are changeable in real time, the camera parameters including position, orientation, ranges of camera view or angle (fieldOfView), front and back of a camera volume (nearPlane and farPlane) and projection information(orthographic) on whether an object is projected on a camera orthographically or perspectively; and
reproducing animation of the 3D object, using the DIBR data, the time information of the animation data and the camera parameter values corresponding to the animation data,
wherein the received DIBR data of the 3D object reflects values of the different camera parameters changing in real time by changing a field type in at least one of an MPEG DepthImage node and a DepthImage V2 node to a field type that reflects the values of the different camera parameters changing in real time;
wherein each of the field types of a data structure expressing the camera parameters that are changed in real time is set to exposedField to indicate that the field is capable of being changed in real time;
wherein the data structure expressing the camera parameters is an MPEG DepthImage node of data type SF3DNode or a DepthImage V2 node of data type SF3DNode.

10. A depth image-based representation (DIBR) method of rendering a 3D object, the method comprising:
receiving camera motion information, variable view frustum information, and reference images generated by modeling a 3D object; and
generating a DIBR object using the camera motion information, variable view frustum information, and reference images, and using the variable view frustum information and the camera motion information in rendering,
wherein while the modeling and/or the rendering of the 3D object is performed, a plurality of different camera parameters are changed, the camera parameters including position, orientation, ranges of camera view or angle (fieldOfView), front and back of a camera volume (nearPlane and farPlane) and projection information(orthographic) on whether an object is projected on a camera orthographically or perspectively, and
wherein DIBR data is generated reflecting values of the different camera parameters changing in real time by changing a field type in at least one of an MPEG DepthImage node and a DepthImage V2 node to a field type that reflects the values of the different camera parameters changing in real time;
wherein each of the field types of a data structure expressing the camera parameters that are changed in real time is set to exposedField to indicate that the field is capable of being changed in real time;
wherein the data structure expressing the camera parameters is an MPEG DepthImage node of data type SF3DNode or a DepthImage V2 node of data type SF3DNode.

11. A non-transitory computer readable recording medium having embodied thereon a computer program for executing the method of claim 1 to be implemented using one or more processors.

12. A non-transitory computer readable recording medium having embodied thereon a computer program for executing the method of claim 6 to be implemented using one or more processors.

13. A non-transitory computer readable recording medium having embodied thereon a computer program for executing the method of claim 9 to be implemented using one or more processors.

14. A non-transitory computer readable recording medium having embodied thereon a computer program for executing the method of claim 10 to be implemented using one or more processors.

15. A depth image-based representation (DIBR) rendering apparatus to model a 3D object, to which a camera animation support function is added, the apparatus comprising:
a DIBR data input unit to receive DIBR data of a 3D object;
a camera animation data input unit to receive time information of real time changing animation data and camera parameter values corresponding to the real time changing animation data, wherein in the camera parameter values, values of a plurality of different camera parameters are changed in real time and the camera parameters comprise position, orientation, ranges of camera view or angle (fieldOfView), front and back of a camera volume (nearPlane and farPlane) and projection information(orthographic) on whether an object is projected on a camera orthographically or perspectively, and an animation reproduction unit to use the DIBR data, the time information, and the camera parameter values to reproduce the animation of the 3D object, wherein the DIBR data received by the DIBR data input unit reflects values of the different camera parameters changing in real time by changing a field type in at least one of an MPEG DepthImage node and a DepthImage V2 node to a field type that reflects the values of the different camera parameters changing in real time;

wherein each of the field types of a data structure expressing the camera parameters that are changed in real time is set to exposedField to indicate that the field is capable of being changed in real time;

wherein the data structure expressing the camera parameters is an MPEG DepthImage node of data type SF3DNode or a DepthImage V2 node of data type SF3DNode.

16. A depth image-based representation (DIBR) apparatus to model and render a 3-dimensional (3D) object, the apparatus comprising:

a unit to add a plurality of different camera parameters to image data of an input 3D object, and, when the image data changes in real time, to change values of the plurality of different camera parameters in accordance with the changes in the image data, to extract data to express the 3D object from the image data, and to convert the extracted data into DIBR data, wherein the camera parameters comprise position, orientation, ranges of camera view or angle (fieldOfView), front and back of a camera volume (nearPlane and farPlane) and projection information(orthographic) on whether an object is projected on a camera orthographically or perspectively, and wherein the unit generates DIBR data reflecting values of the different camera parameters changing in real time by changing a field type in at least one of an MPEG DepthImage node and a DepthImage V2 node to a field type that reflects the values of the different camera parameters changing in real time;

a camera animation data generation unit to extract time information and camera parameter values that correspond to the image data and which are changeable in real time in accordance with the changes in the image data, from the data extracted by the 3D data processing unit;

a DIBR data input unit to receive DIBR data;

a camera animation data input unit to receive the time information and the camera parameter values; and an animation reproduction unit to use the DIBR data, the time information, and the camera parameter values to reproduce the animation of the 3D object;

wherein each of the field types of a data structure expressing the camera parameters that are changed in real time is set to exposedField to indicate that the field is capable of being changed in real time;

wherein the data structure expressing the camera parameters is an MPEG DepthImage node of data type SF3DNode or a DepthImage V2 node of data type SF3DNode.

17. A depth image-based representation (DIBR) method of modeling and/or rendering a 3-dimensional (3D) object that is expressed by image information and camera parameters, the method comprising:

modeling and/or rendering the 3D object according to the image information and the camera parameters;

while the modeling and/or the rendering of the 3D object is performed, changing values of a plurality of different camera parameters, by a modeling and/or rendering apparatus, in real time, the camera parameters comprising position, orientation, ranges of camera view or angle (fieldOfView), front and back of a camera volume (nearPlane and farPlane) and projection information(orthographic) on whether an object is projected on a camera orthographically or perspectively; and generating DIBR data reflecting values of the different camera parameters changing in real time by changing a field type in at least one of an MPEG DepthImage node and a DepthImage V2 node to a field type that reflects the values of the different camera parameters changing in real time;

wherein each of the field types of a data structure expressing the camera parameters that are changed in real time is set to exposedField to indicate that the field is capable of being changed in real time;

wherein the data structure expressing the camera parameters is an MPEG DepthImage node of data type SF3DNode or a DepthImage V2 node of data type SF3DNode.

18. The method of claim 1, wherein the 3D object is a 3D DIBR object.

* * * * *

UNITED STATES PATENT AND TRADEMARK OFFICE
CERTIFICATE OF CORRECTION

PATENT NO.       : 8,111,254 B2                                     Page 1 of 1
APPLICATION NO.  : 11/401223
DATED            : February 7, 2012
INVENTOR(S)      : Gyeongja Jang et al.

It is certified that error appears in the above-identified patent and that said Letters Patent is hereby corrected as shown below:

Title page item (75), (Inventors), Line 3, Delete "Shinlun" and insert -- Shinjun --, therefor.

Title Page Col. 2 (Other Publications), Line 2, Delete "eXtesnion," and insert -- eXtension, --, therefor.

Column 10, Line 49, In Claim 6, delete "Depth Image" and insert -- DepthImage --, therefor.

Signed and Sealed this
Twenty-ninth Day of May, 2012

David J. Kappos
*Director of the United States Patent and Trademark Office*